March 31, 1953     A. FREW     2,633,097
NOISEMAKING ATTACHMENT FOR BICYCLES
Filed May 11, 1951
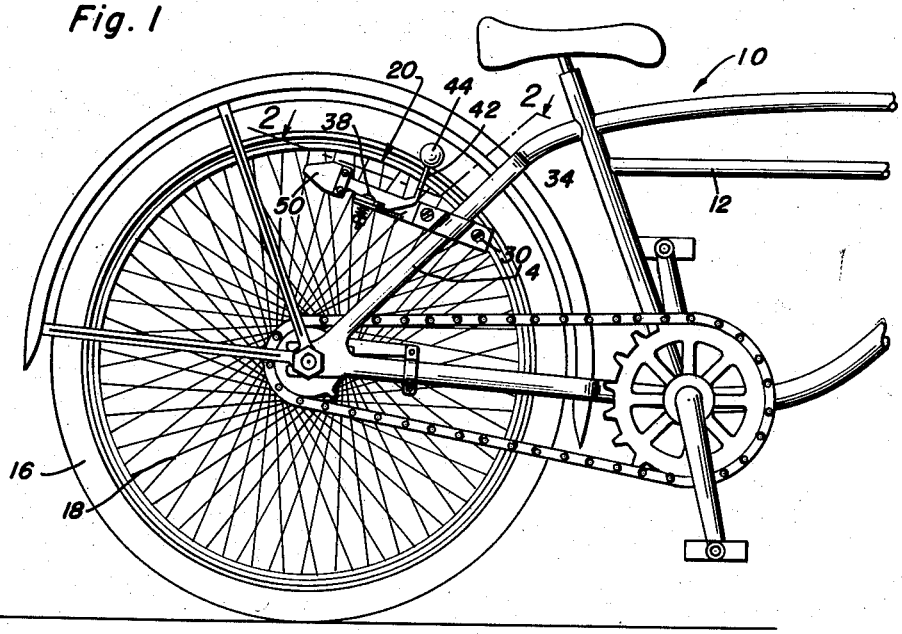
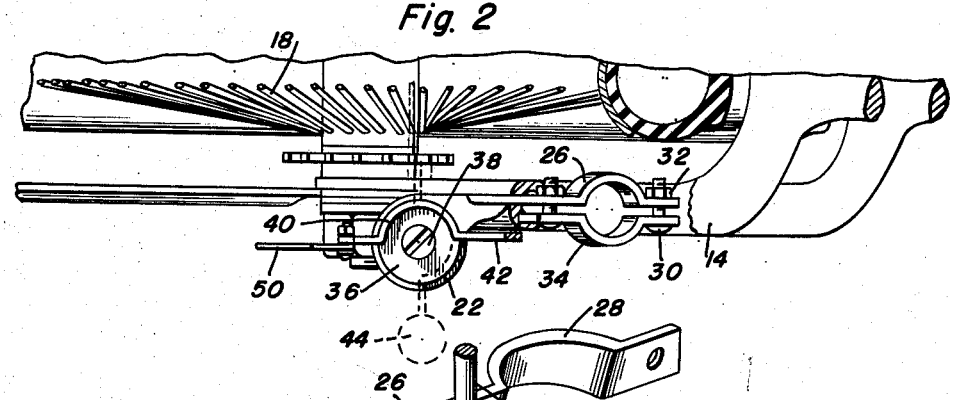
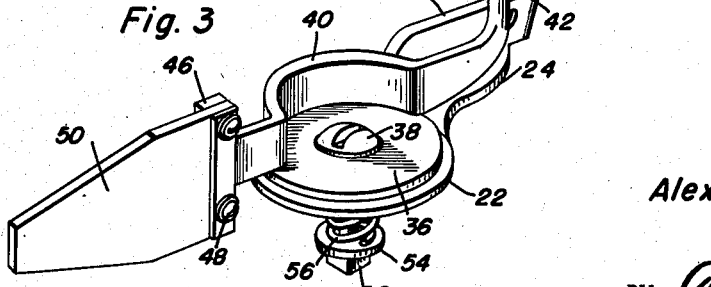
Alex Frew
*INVENTOR.*

Patented Mar. 31, 1953

2,633,097

UNITED STATES PATENT OFFICE 2,633,097

NOISEMAKING ATTACHMENT FOR BICYCLES

Alex Frew, Midwest City, Okla.

Application May 11, 1951, Serial No. 225,717

4 Claims. (Cl. 116—56)

This invention relates to an attachment for a bicycle, the primary object of which is to impart an intermittent sound thereto during movement of the bike, which sound resembles that of a motor bicycle.

A further object of the invention is to provide a noise making attachment for a bicycle which includes a flexible blade and a means for selectively urging said blade into or out of engagement with the revolving spokes of the bicycle wheel, the attachment being inexpensive, simple to operate, attractive and non-injurious to the operating parts of the bicycle.

These, together with various ancillary objects and features of the invention which will later become apparent as the following description proceeds are attained by the device, a preferred embodiment of which has been illustrated by way of example only in the accompanying drawings, wherein:

Figure 1 is a side elevational view of the device shown mounted on a bicycle;

Figure 2 is a sectional view taken on the line 2—2 of Figure 1; and

Figure 3 is a perspective view of the device per se.

Specific reference is now made to the drawings. In the several views in the accompanying drawings and in the following specification reference characters indicate corresponding elements throughout.

Indicated at 10 is a conventional bicycle having a frame 12 including a fork 14 supporting a wheel 16 having the usual spokes 18. The present device is shown at 20 and is adapted to be secured to the frame either at the rear or the front wheel and it will be understood that the same can be used with any vehicle having spoked wheels.

The device comprises a plate 22 having an extension 24 to which is secured integrally or by any other suitable means, one-half of a clamp bar 26 which is disposed in a plane generally perpendicular to that of the plate. The bar has an intermediate arcuate portion 28 adapted to engage the inner side of the fork 14 and is removably secured by appropriate headed screws 30 and nuts 32 to a further clamp bar 34 of similar shape and construction, the two clamp bars cooperating to embrace the fork 14 as shown in Figure 1.

A disk 36 is pivotally mounted on the plate 22 by means of a headed hinge bolt 38, the disk lying in a plane parallel to that of the plate. Integral with or otherwise secured adjacent the peripheral edge of the disk is a vertical elongated bar 40 which is disposed in a plane perpendicular to that of the disk and has end portions extending beyond the periphery of the disk. One end portion is extended to form a vertical handle 42 having a knob 44 thereon. The other end has a vertical bar 46 to which is removably secured as by screws or bolts 48 a relatively thin flexible blade, clapper or reed 50 fabricated of a non-metal such as plastic, leather, or any combination of such flexible material suitable and necessary to produce the desired sound effect.

A means is provided for resiliently and yieldably urging the plate 22 into frictional engagement with the disk 36 and this means includes a nut 52 on the free end of the bolt 38, a washer 54 on the bolt adjacent the nut and a relatively heavy coil spring 56 wound about the bolt between the washer and the bottom of the plate normally urging the latter into frictional engagement with the bottom surface of the disk.

In use, the device is secured on the fork by the clamping bars 28 and 34 and the screws and nuts 30 and 32 preferably adjacent the upper portion of the wheel 16. By turning the handle 42 in a clockwise direction, the blade 50 is pushed into the wheel between a pair of spokes 18 and movement of the bicycle will create an intermittent put-put sound resembling that of a motor bicycle. The blade is held in spoke-engaging position by the spring 56 urging the plate 22 into frictional engagement with the disk 36. By turning the handle counter-clockwise, the blade is removed from the spokes and held in a non-noise making position by the tension of the spring 56.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. A noise making attachment for a bicycle comprising a plate, means for clamping said plate on the frame of a bicycle, a disk, means pivotally mounting said disk in said plate, an arm secured to said disk having an upstanding handle on one end thereof, a flexible clapper removably secured on the other end of said arm and adapted to be urged into and out of engagement with the spokes of a bicycle wheel, and resilient means yieldably retaining said disk on said plate in adjusted pivoted position.

2. The combination of claim 1 wherein said plate and disk are disposed in parallel planes and said flexible clapper is generally disposed in a plane perpendicular to those of the plate and disk.

3. The combination of claim 1 wherein said pivotal mounting means includes a headed bolt extending through said disk and plate and said resilient means includes a nut on the free end of said bolt, and a spring on said bolt interposed between said nut and said plate and urging the latter into frictional engagement with said disk.

4. A noise making attachment for a bicycle comprising an elongated clamp attached at one end to the frame of the bicycle and extending alongside one wheel of the bicycle, a plate on the other end of the clamp substantially horizontal, a disk on top of said plate, a bolt rotatably attaching said disk to said plate parallel therewith and for rotation about an axis perpendicular to the plate, a handle extending from one side of the disk for rotating the same, a flexible clapper extending from the other side of the disk for positioning between the spokes of the wheel by rotation of the disk, and means securing said handle and clapper to disk.

ALEX FREW.

REFERENCES CITED

The following references are of record in the file of this patent:

UNITED STATES PATENTS

| Number | Name | Date |
|---|---|---|
| 561,667 | Kelly | June 9, 1896 |